(12) United States Patent
Passaro et al.

(10) Patent No.: US 8,055,412 B2
(45) Date of Patent: Nov. 8, 2011

(54) SYSTEM AND METHOD FOR DISPLAYING CONTROL INFORMATION TO THE VEHICLE OPERATOR

(75) Inventors: Robert Passaro, San Francisco, CA (US); Frank Breker, Oxnard, CA (US); Dale Alan Herigstad, Hollywood, CA (US); Alec Bernstein, Malibu, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1197 days.

(21) Appl. No.: 11/807,637

(22) Filed: May 29, 2007

(65) Prior Publication Data

US 2008/0300756 A1 Dec. 4, 2008

(51) Int. Cl.
*H04Q 1/00* (2006.01)
(52) U.S. Cl. ............... 701/49; 341/22; 341/34; 340/11.1
(58) Field of Classification Search .............. 701/8, 36, 701/49; 715/864; 340/425.5, 438
See application file for complete search history.

(56) References Cited

U.S. PATENT DOCUMENTS

| | | | | |
|---|---|---|---|---|
| 5,844,500 A * | 12/1998 | Beuk et al. | ...... | 341/22 |
| 5,923,267 A * | 7/1999 | Beuk et al. | ...... | 340/5.54 |
| 6,556,899 B1 * | 4/2003 | Pachet et al. | ...... | 701/29 |
| 7,057,271 B2 * | 6/2006 | Forstner et al. | ...... | 257/691 |
| 7,057,521 B1 * | 6/2006 | Beuk et al. | ...... | 340/11.1 |
| 2004/0260439 A1 * | 12/2004 | Endo et al. | ...... | 701/36 |
| 2006/0001548 A1 * | 1/2006 | Beuk et al. | ...... | 340/825.56 |
| 2007/0198141 A1 * | 8/2007 | Moore | ...... | 701/3 |

OTHER PUBLICATIONS

Design and evaluation of a vibrotactile seat to improve spatial awareness while driving; Morrell, J.; Wasilewski, K.; Haptics Symposium, 2010 IEEE; Digital Object Identifier: 10.1109/HAPTIC.2010. 5444642; Publication Year: 2010 , pp. 281-288.*
A systems theoretical model for human perception in multimodal presence systems; Kammermeier, P.; Buss, M.; Schmidt, G.; Mechatronics, IEEE/ASME Transactions on; vol. 6 , Issue: 3; Digital Object Identifier: 10.1109/3516.951361; Publication Year: 2001 , pp. 234-244.*
Design of an Enhanced ACC for Collision Detection and Prevention Using RTOS; Saravanan, P.; Anbuselvi, M.; Advances in Computing, Control, & Telecommunication Technologies, 2009. ACT '09. International Conference on; Digital Object Identifier: 10.1109/ACT. 2009.152; Publication Year: 2009 , pp. 599-601.*
Real time image reconstruction using GPUs for a surgical PET imaging probe system; Huh, S.S.; Li Han; Rogers, W.L.; Clinthorne, N.H.; Nuclear Science Symposium Conference Record (NSS/MIC), 2009 IEEE; Digital Object Identifier: 10.1109/NSSMIC.2009.5402312; Publication Year: 2009 , pp. 4148-4153.*

(Continued)

*Primary Examiner* — Cuong H Nguyen
(74) *Attorney, Agent, or Firm* — Crowell & Moring LLP

(57) ABSTRACT

Vehicle control information is displayed to a vehicle operator in a central display area. In one embodiment, a sensor associated with a vehicle control is configured to detect an approaching operator. A graphical representation of the vehicle control may be displayed in a central display area and, in one embodiment, is displayed with a varying physical characteristic representative of the distance between the vehicle operator and the vehicle control itself. A second graphical representation of the vehicle control may be displayed in the central display area in response to detecting that the vehicle operator has contacted the vehicle control. In one embodiment, the second graphical representation includes a current control value for the vehicle control.

22 Claims, 7 Drawing Sheets

OTHER PUBLICATIONS

Researches on secure proximity distance defending attack of finger table based on chord; Jie Li; Xiaofeng Qiu; Yang Ji; Chunhong Zhang; Advanced Communication Technology, 2009. ICACT 2009. 11th International Conference on vol. 03; Publication Year: 2009, pp. 1923-1927.*

Slow movement small target detecting method base on frame correlation; Wei Min; Chen HaiNing; Wu QinZhang; Xu Bin; Mechanic Automation and Control Engineering (MACE), 2010 International Conference on; Digital Object Identifier: 10.1109/MACE.2010. 5536380; Publication Year: 2010, pp. 4742-4744.*

Handy Viewer with User Interface According to Device Movement; Matsuda, M.; Nonaka, T.; Kokaji, R.; Shimano, M.; Hase, T.; Consumer Electronics, 2007. ICCE 2007. Digest of Technical Papers. International Conference on; Digital Object Identifier: 10.1109/ICCE.2007.341309; Publication Year: 2007, pp. 1-2.*

Sensing and Motion Control of Virtual Objects for Web Camera-Based Game; Dae Ho Lee; Young Jae Lee; Future Generation Communication and Networking, 2008. FGCN'08. Second International Conference on; vol. 2 Digital Object Identifier: 10.1109/FGCN. 2008.38; Publication Year: 2008, pp. 28-33.*

Tracking of Moving Objects by Using a Low Resolution Image; Sugandi, B.; Hyoungseop Kim; Joo Kooi Tan; Ishikawa, S.; Innovative Computing, Information and Control, 2007. ICICIC '07. Second International Conference on Digital Object Identifier: 10.1109/ICICIC.2007.600; Publication Year: 2007, pp. 408.*

Wireless control of powered wheelchairs with tongue motion using tongue drive assistive technology; Huo, Xueliang; Wang, Jia; Ghovanloo, Maysam; Engineering in Medicine and Biology Society, 2008. EMBS 2008. 30th Annual International Conference of the IEEE; Digital Object Identifier: 10.1109/IEMBS.2008.4650135; Publication Year: 2008, p. 4.*

Input Method by Hand Motion for a Portable Information Appliance; Matsuda, M.; Nonaka, T.; Hase, T.; Systems, Man and Cybernetics, 2006. SMC '06. IEEE International Conference on; vol. 1; Digital Object Identifier: 10.1109/ICSMC.2006.384375; Publication Year: 2006, pp. 157-161.*

T-less: A novel touchless human-machine interface based on infrared proximity sensing; Dongseok Ryu; Dugan Um; Tanofsky, P.; Do Hyong Koh; Young Sam Ryu; Sungchul Kang; Intelligent Robots and Systems (IROS), 2010 IEEE/RSJ International Conference on; Digital Object Identifier: 10.1109/IROS.2010.5649433; Publication Year: 2010, pp. 5220-.*

FreeDigiter: a contact-free device for gesture control; Metzger, C.; Anderson, M.; Starner, T.; Wearable Computers, 2004. ISWC 2004. Eighth International Symposium on; vol. 1; Digital Object Identifier: 10.1109/ISWC.2004.23 Publication Year: 2004, pp. 18-21; Cited by: 4.*

Reactive grasping using optical proximity sensors; Hsiao, Kaijen; Nangeroni, Paul; Huber, Manfred; Saxena, Ashutosh; Ng, Andrew Y.; Robotics and Automation, 2009. ICRA '09. IEEE International Conference on; Digital Object Identifier: 10.1109/ROBOT.2009. 5152849; Publication Year: 2009, pp. 2098-2105.*

Inverse Piano Technique: a New Tool to Study Finger Interdependence; Budgeon, M.K.; Zong-Ming Li; Latash, M.L.; Zatsiorsky, V.M.; Haptic Interfaces for Virtual Environment and Teleoperator Systems, 2006 14th Symposium on; Digital Object Identifier: 10.1109/HAPTIC.2006.1627097; Publication Year: 2006, pp. 395-398.*

RBF Network Based Feature-Level Data Fusion for Robotic Multi-sensor Gripper; Hong Sun; Hai-chuan Zhu; Ting Wu; Computational Sciences and Optimization, 2009. CSO 2009. International Joint Conference on; vol. 1; Digital Object Identifier: 10.1109/CSO.2009. 331; Publication Year: 2009, pp. 719-722.*

* cited by examiner

SYSTEM AND METHOD FOR DISPLAYING CONTROL INFORMATION TO THE VEHICLE OPERATOR

FIELD OF THE INVENTION

The present invention relates, in general, to vehicle control operation information and, more particularly to displaying information representative of an operator's interaction with one or more of a vehicle's controls.

BACKGROUND OF THE INVENTION

In the context of an vehicle cockpit, vehicle controls and associated display systems require that the user look away from the road to perform such simple operations as adjusting the cabin temperature to a specific value, changing the radio station, and displaying information, such as current navigation information. Heretofore, vehicle operators would first have to locate the physical control itself. This task may require visually scanning the cockpit control area to pinpoint the control's precise location. Optionally, vehicle operators may maintain their line of site with the road while "feeling around" until contact is made with a knob or other input device that approximates the same shape and size as the target control.

Once the control is located and physically contacted, the vehicle operator would then have to view a display, usually located near the control itself, in order to ascertain the control's current value or general information representative of the current status of the desired variable that is meant to be changed (e.g., cabin temperature, radio station, etc.). Even then, the vehicle operator will have to maintain visual contact with the control area to determine when the desired control value has been reached. Additionally, in the case of vehicles which utilize a Central Information Display (CID), the operator would have to glance towards the CID in order to discern which among the several fields of data shown is the one that is being changed. This requires additional scanning of information and further distraction from the main task at hand, which is safely driving the vehicle.

In sum, prior art vehicle control operation systems require the vehicle operator to look away from the road to locate the target control, obtain information about the control's current value and to determine when the new desired control value has been reached. primary line of sight, the main disadvantages of the prior art are as follows. Accordingly, there is a need in the art for a system and method of displaying vehicle control information to the vehicle operator.

BRIEF SUMMARY OF THE INVENTION

Disclosed and claimed herein are systems and methods for displaying control information to a vehicle operator. In one embodiment, a method includes detecting a first operator proximity to a vehicle control, displaying, on a central display, a first graphical representation of the vehicle control in response to detecting the first operator proximity. The method further includes detecting operator contact of the vehicle control, and displaying, on the central display, a second graphical representation of the vehicle control in response to the operator contact, where the second graphical representation includes a current control value for the vehicle control.

In another embodiment, a system for displaying vehicle control information includes a vehicle control, a control sensor coupled to the vehicle control, a central display, and a processor electrically connected to the vehicle control, the control sensor and the central display. In one embodiment, the processor is configured to receive, from the control sensor, a first operator proximity to a vehicle control, and to display, on the central display, a first graphical representation of the vehicle control in response to the first operator proximity. The processor is further configured to receive, from the control sensor, an operator contact of the vehicle control, and display, on the central display, a second graphical representation of the vehicle control in response to the operator contact, where the second graphical representation includes a current control value for the vehicle control.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF EXEMPLARY EMBODIMENTS

Figure 1A:
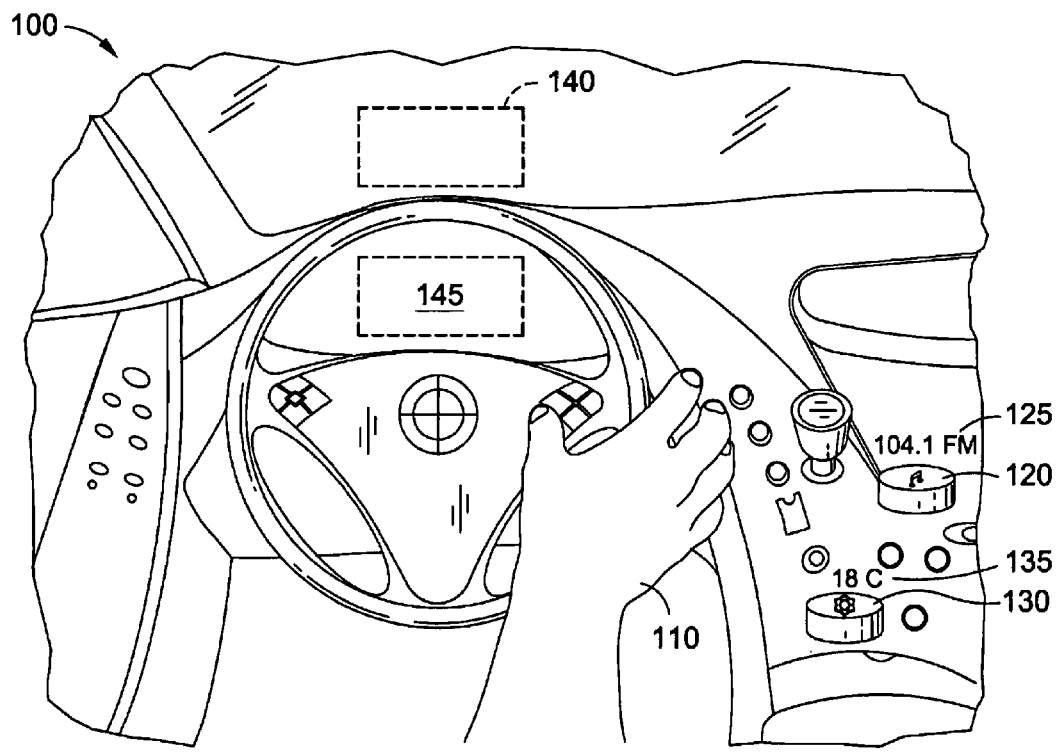
FIGS. 1A-1D depict control operation information being displayed in the heads up display area of a vehicle cockpit, according to one or more embodiments of the invention.

The following disclosure relates to the displaying of vehicle control information in a central display of a vehicle cockpit. By way of overview, in one embodiment a sensor associated with a vehicle control is configured to detect an approaching operator. In response thereto, a graphical representation of the vehicle control may be displayed in a central display area. In certain embodiments, the relative size or other physical characteristic may be varied as a function of the distance between the vehicle operator and the vehicle control itself.

As will be described in detail below, upon detecting that the vehicle operator has contact the vehicle control, a second graphical representation of the vehicle control may be displayed in the central display area, where the second graphical representation includes a current control value for the vehicle control.

In another embodiment, a third graphical representation of the vehicle control may be displayed in response to detecting that the operator has change the control value, where the third graphical representation includes an updated control value for the vehicle control.

In still another embodiment, the relative position of the operator to the vehicle control may be determined, and visually represented in the central display area using a graphical representation orientation that is representative of the relative operator position.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner on one or more embodiments without limitation. The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable medium, which may include any medium that can store or transfer information. Examples of the processor readable mediums include an electronic circuit, a semiconductor memory device, a read-only memory (ROM), a flash memory or other non-volatile memory, a floppy diskette, a CD-ROM, an optical disk, a hard disk, a fiber optic medium, a radio frequency (RF) link, etc.

Referring now to FIG. 1A, depicted is a vehicle cockpit 100 configured to implement one more embodiments of the invention. As shown, operator 110 is depicted at the initial stages of reaching for one of vehicle controls 120 and 130. It should be noted that central display area 140 need not contain any vehicle-control-related information at this initial stage of the operator 110 reaching for one of the vehicle controls 120 or 130. While vehicle control 120 is depicted as a radio tuning knob and vehicle control 130 is depicted as a cabin temperature knob, it should equally be appreciated that vehicle controls 120 and 130 may correspond to any other vehicle-related variable, such as fan speed, radio volume, headlight setting, etc.

Continuing to refer to FIG. 1A, cockpit 100 further includes central display area, which in one embodiment may be a so-called heads-up display as shown by central display area 140, or alternatively as a liquid crystal display (LCD) or similar type of display corresponding to an instruments cluster area of the cockpit's dashboard, as shown by central display area 145. While following disclosure will generally depict the central display area as having the orientation of central display area 140, it should be understood that in all embodiments it may similarly have the orientation of central display area 145. In general, it should be appreciated that the central display area 140/145 may correspond to any display which is oriented and configured such that the operator 110 may view the central display area 140/145 while maintaining uninterrupted visual contact with the road ahead (e.g., behind or above the vehicle's steering wheel).

Each vehicle control is further depicted as having an associated current control value being displayed essentially adjacent to the corresponding vehicle control, as is typically the case. Cockpit 100 maintains the typical configuration of having a local current control value 125 correspond to the current setting for vehicle control 120, and current control value 135 correspond to the current setting for vehicle control 130. Although not depicted as such for clarity sake, it should be appreciated that current control values 125 and 135 are typically displayed by an LCD screen (or similar display device) located adjacent to or otherwise in the vicinity of vehicle controls 120 and 130, respectively. It should be noted that this paragraph contains intentional references to the prior art placement of current control values 125 and 135 in order to further highlight the differences between the prior art and the invention. Aside from references to the current control values 125 and 135, no other portion of this Detailed Description contains admitted prior art.

In accordance with the principles of the invention, vehicle controls 120 and/or 130 further may be equipped with a proximity sensor circuit. In one embodiment, such a proximity sensor control may comprise a capacitive sensor, as is generally known in the art of sensors. However, it should further be appreciated that any proximity sensor circuit capable of detecting the operator 110's proximity to the vehicle control 120 may be used in accordance with the teachings of the invention (e.g., electronic sensing).

Figure 1B:
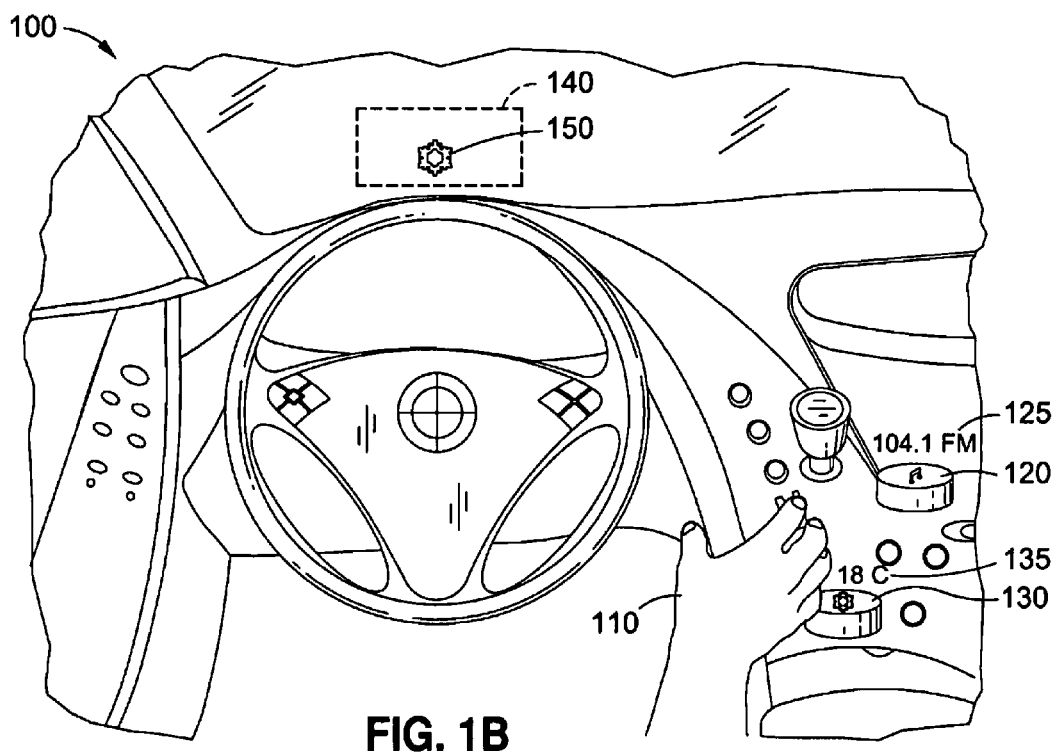

FIG. 1B depicts the vehicle cockpit 100 as the operator 110 approaches the location of vehicle control 130. As previously mentioned, the vehicle control 130 may be equipped with a proximity sensor circuit capable of detecting the approaching hand of operator 110. In one embodiment, in response to detecting the operator's proximity to the vehicle control 130, a graphical representation 150 may be displayed in the central display area 140. In one embodiment the graphical representation 150 may be representative of the type of variable the vehicle control 130 relates to. For example, in the present embodiment the vehicle control 130 corresponds to a knob for controlling cabin temperature. To that end, the graphical representation 150 in this embodiment is an icon having a snowflake shape. In this fashion, the operator 110 may be alerted to the fact that their hand is approaching the vehicle's temperature control knob (i.e., vehicle control 130) without having to glance away from the direction of the road ahead.

In another embodiment, a physical characteristic of the graphical representation 150 may be varied to represent the current distance between the operator 110 and the vehicle control 130. By way of a non-limiting example, the size of the graphical representation 150 being displayed may increase as the operator 110 draws closer to the subject control (i.e., vehicle control 130). Alternatively, the color of the graphical representation 150 may be altered to correspond to the distance of the approaching operator 110. It should equally be appreciated that any other graphical attribute of the graphical representation 150 may be used to indicate the current distance between the operator 110 and the subject control.

Figure 1C:
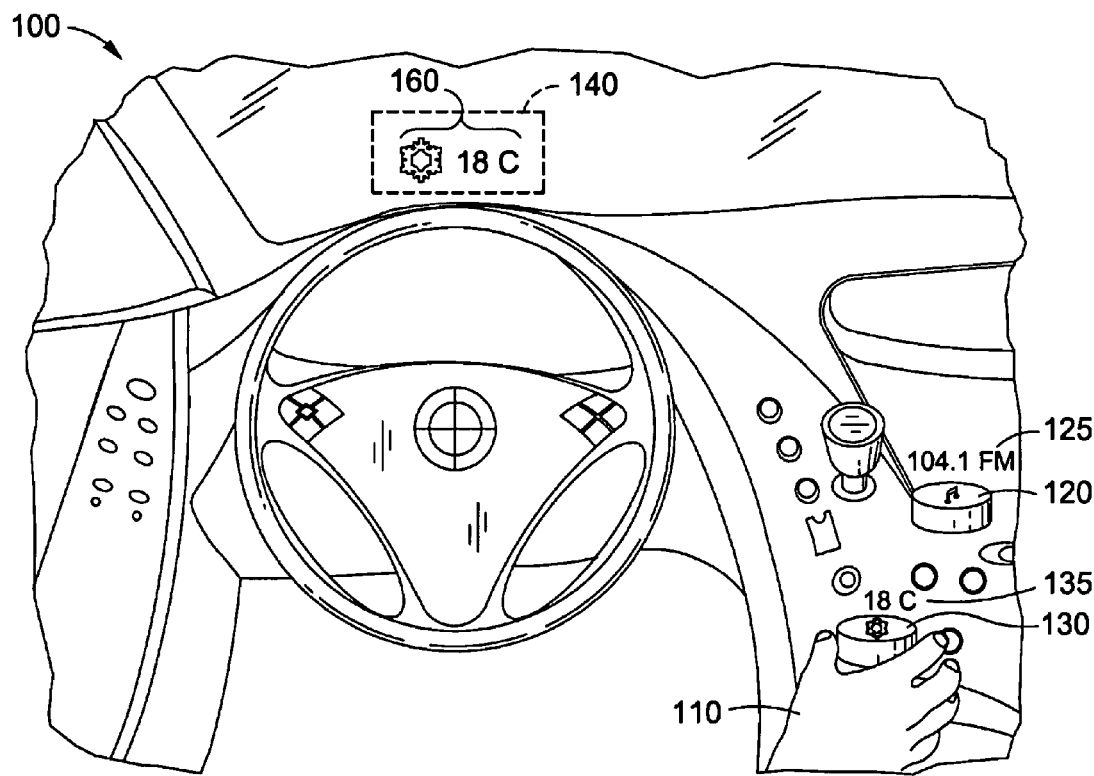

FIG. 1C depicts the vehicle cockpit 100 just after the operator 110 has contacted the vehicle control 130. As depicted in the embodiment of FIG. 1C, in response to the operator 100 contacting the vehicle control 130, the central display area 140 may display a second form of the graphical representation 160. In particular the graphical representation 160 may include a graphically larger version of graphical representation 160, as well as a current control value (i.e., 18° C.). In one embodiment, the operator 110 contact may be detected by the same proximity sensor circuit used to detect the operator's proximity, as described above with reference to FIG. 1B. In one embodiment, the proximity sensor circuit may detect the operator 110 contact upon the circuit being grounded as a result of the operator 100 contact.

Figure 1D:
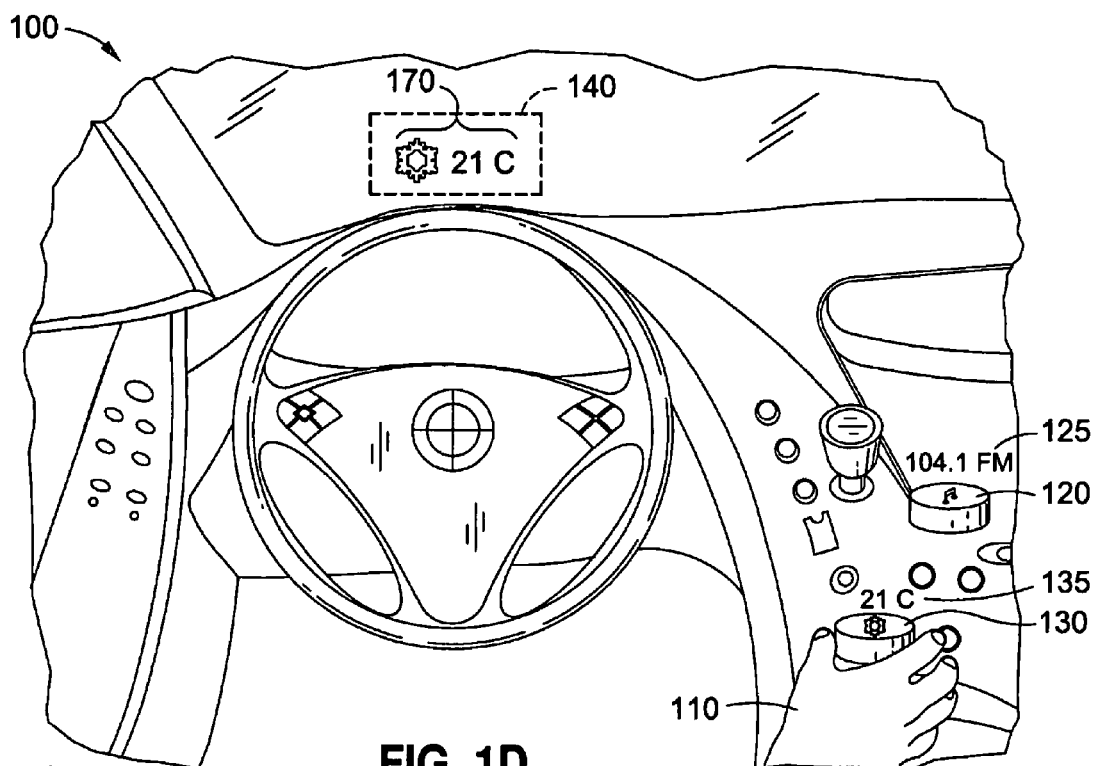

Referring now to FIG. 1D, depicted is still another embodiment of vehicle cockpit 100 after the operator 100 has changed the value of the vehicle control from 18° C. to 21° C. In particular, as the operator 100 actuates the vehicle control (e.g., turns the temperature knob), the adjacently-displayed current control value 135 is correspondingly updated. However, in one embodiment of the invention the graphical representation 170 in the central display area 140 is also updated thereby enabling the operator 110 to maintain line of sight with the road ahead while setting the vehicle control 130 to a desired setting.

Figure 2A:
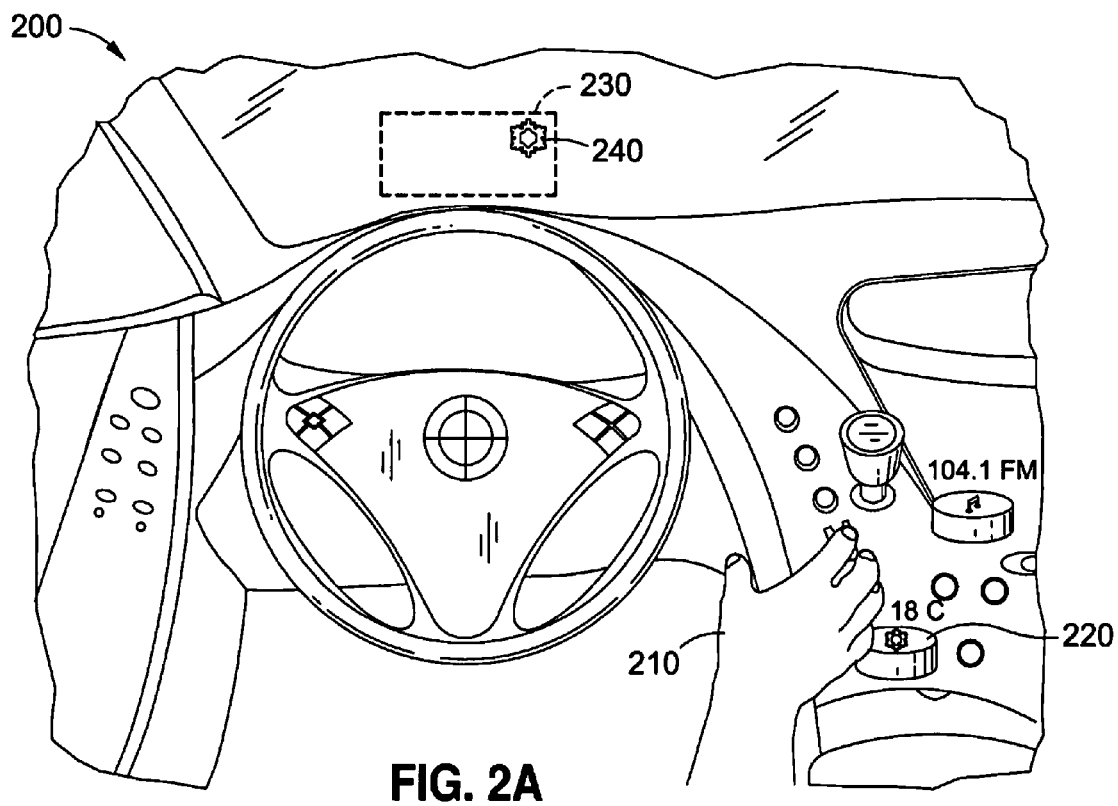
FIGS. 2A-2B depict control operation information being displayed in the heads up display area of a vehicle cockpit, according to another embodiment of the invention.

Referring now to FIG. 2A, depicted is still another embodiment of a vehicle cockpit 200 which is configured in accordance with the principles of the invention. In particular, FIG. 2A depicts an operator 210 in proximity (but not yet contacting) vehicle control 220. In response to the operator's proximity to the control 220, the central display area 230 displays a graphical representation 240 of the vehicle control 220. Moreover, as previously described a physical characteristic (e.g., size) of the graphical representation 240 may be representative of the current distance between the operator 210 and the vehicle control 220.

However, in addition to simply detecting the absolute distance between the operator 210 and the vehicle control 220, the system of FIG. 2A may also detect a relative position of the operator 210 with respect to the subject vehicle control 220. Using this relative position information, the graphical representation 240 may be displayed having an orientation within the central display 230 that is representative of the relative position of the operator 210 to the vehicle control 220. That is, since the control 220 is still located above and to the right of the operator 210, the graphical representation 240 is positioned near the top right corner of the central display area 240.

The relative position orientation of the graphical representation 240 may be provided by a so-called machine vision system. As is known, machine vision is the field of technology which utilizes digital cameras, smart cameras and image processing software to perform visual inspections tasks across a wide range of applications. Alternatively, a combination of control sensors may be used to triangulate or otherwise deduce the vehicle operator's relative position.

Figure 2B:
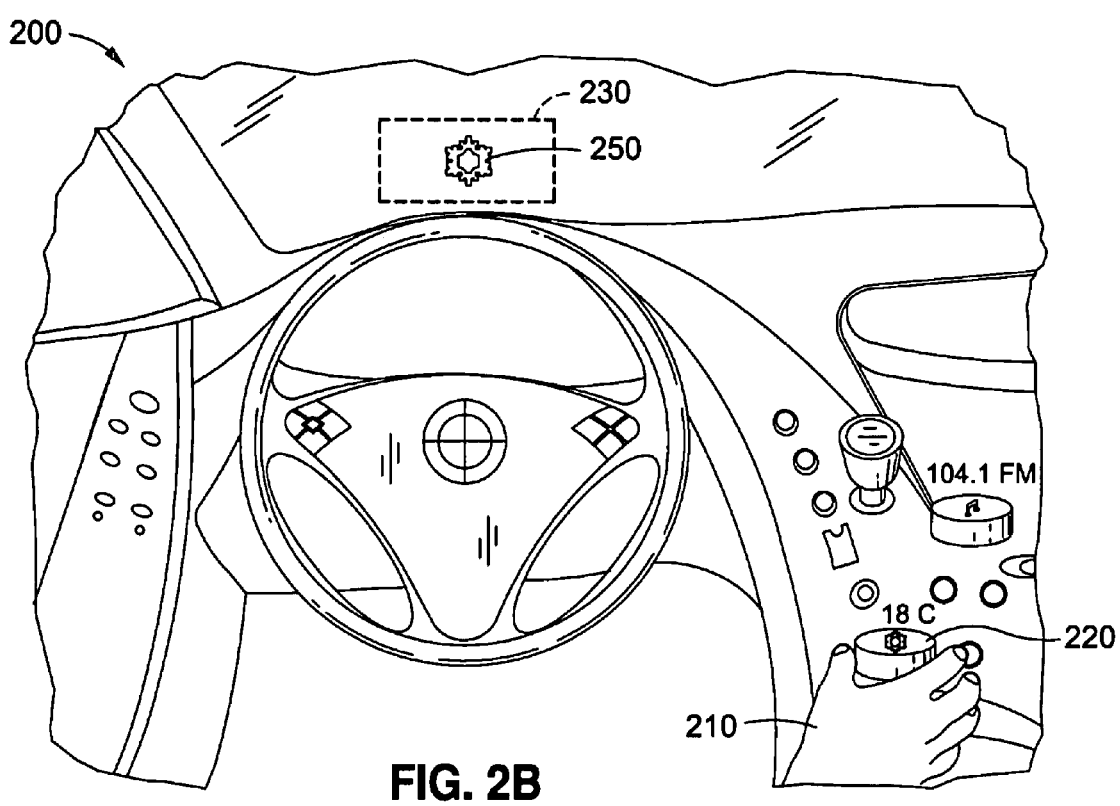

FIG. 2B depicts the case where the operator 210 has now reach the control 220 and is close to the subject control 220. This can be seen by the fact that the graphical representation 240 is now located in the center of the central display area 230, thereby indicating that the operator hand is directly over the subject control 220. Moreover, the larger size of the control is representative of the fact that the operator 210 is now proximately located to the control 220. In this fashion, a vehicle operator will not only be able to ascertain how far they are from the subject control 220, but they will also be able to ascertain in which direction they should continue to move in order to reach the subject control without ever having to take their eyes off the road.

Figure 3A:
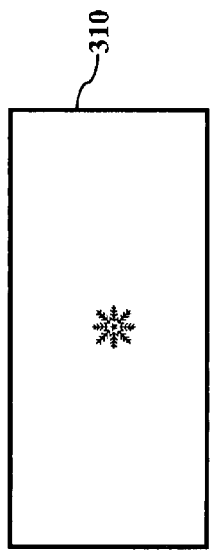
FIGS. 3A-3D depict a sequence of heads up displays containing control operation information representative of a user's proximity to a vehicle control, in accordance with one embodiment of the invention.
Figure 3B:
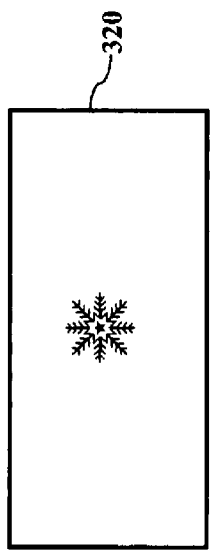
Figure 3C:
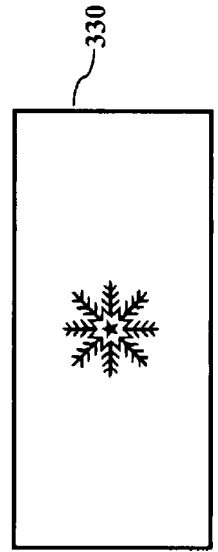
Figure 3D:
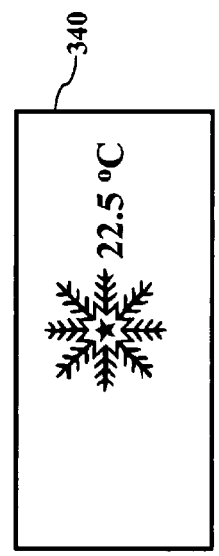

Referring now to FIGS. 3A-3B, depicted are exemplary central display areas 310, 320, 330 and 340, respectively. In one embodiment, central display area 310 of FIG. 3A is displaying a graphical representation of a vehicle control (e.g., cabin temperature control) when an operator proximity is first detected. The central display 320 of FIG. 3B then depicts one embodiment of the control's graphical representation as the operator draws closer to the subject vehicle control. FIG. 3C, in turn, depicts still another embodiment of the control's graphical representation as the operator draws even closer to the subject vehicle control. In short, the size of the graphical representation of FIGS. 3A-3C increases as the operator nears the actual control. Finally, FIG. 3D depicts an embodiment of the central display area 340 once the operator has actually contacted the subject control. In this embodiment, not only does the size of the graphical representation again increase, but a current setting or value associated with the subject control is also displayed in the central display area 340. In this fashion, the vehicle operator may engage a vehicle control and ascertain its current setting without having to glance away from the road.

Figure 4:
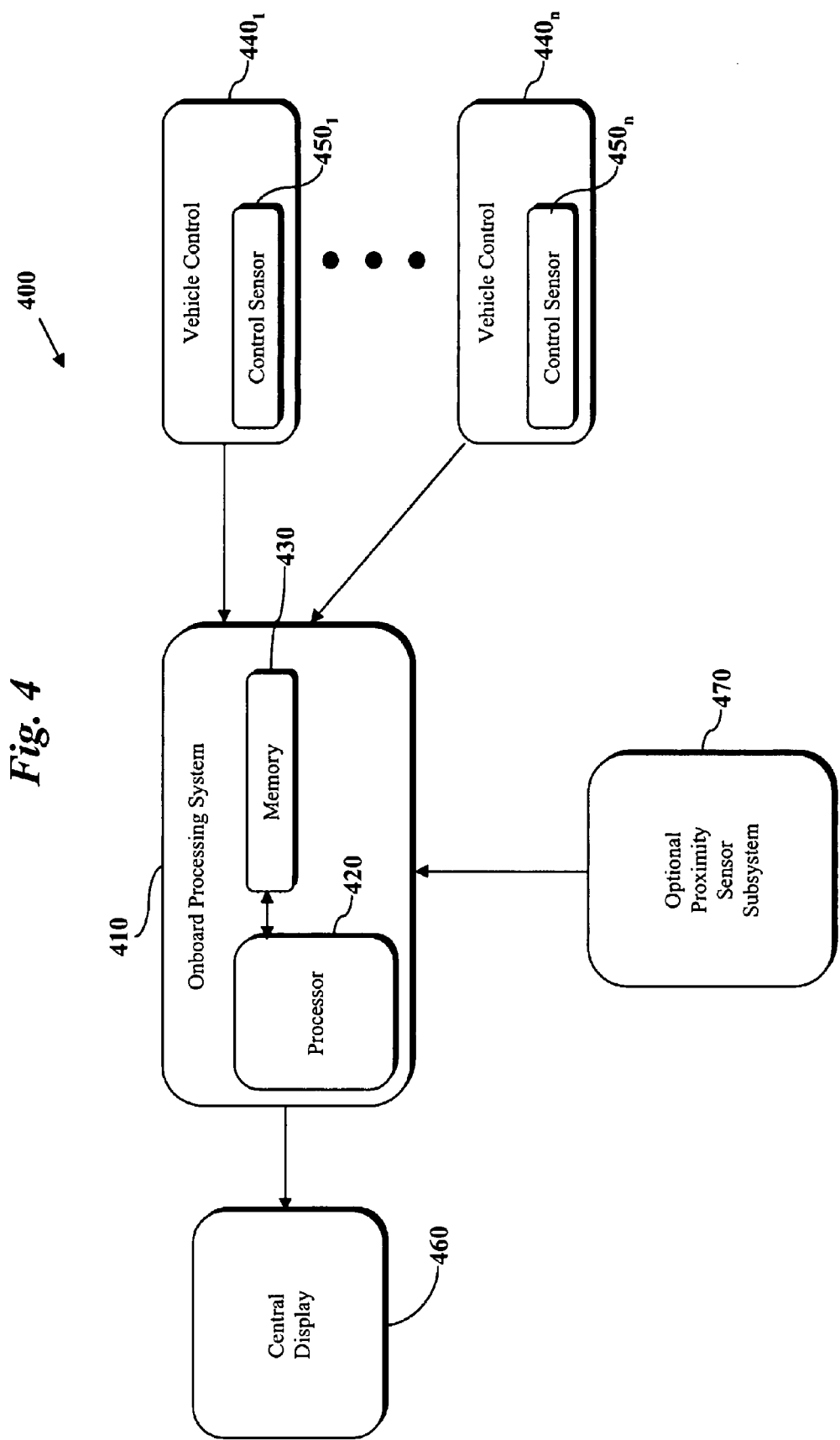
FIG. 4 depicts a simplified schematic of a system for implementing one or more embodiments of the invention.

Referring now to FIG. 4, depicted is one embodiment of a system 400 for implementing one or more aspects of the invention. As depicted, system 400 includes an onboard processing system 410, which may be comprised of a processor 420 and a memory 430. It should be appreciated that the processor 420 may be a general processor, a digital signal processor, an application specific integrated circuit, digital logic device, an analog processor or other now known processing circuit. Similarly, memory 430 may comprise random access memory (RAM), read only memory (ROM), flash memory, any other type of volatile and/or non-volatile memory, as well as any combination thereof. In certain embodiments, memory 430 contains processor-executable instructions to cause system 400 to implement various embodiments of the invention. Such operations are described in detail below with reference to FIGS. 5-6.

System 400 further includes a plurality of vehicle controls $440_1$-$440_n$ ("440") coupled to the onboard processing system 410, and each of which is depicted as containing a control sensor $450_1$-$450_n$ ("450"). As previously discussed, the vehicles controls 440 may correspond to any button, knob, switch or the like usable to control any vehicle-related variable, such as cabin temperature, fan speed, radio station tuned, radio volume, headlight setting, etc. With respect to the control sensors 450, it should be appreciated that they may be comprised of any known proximity sensor circuit, such as a capacitive sensor.

Continuing to refer to FIG. 4, further connected to the onboard processing system 410 is central display 460. In certain embodiments, central display 460 may correspond to a so-called heads-up display, or alternatively to an instruments cluster area of the cockpit's dashboard. However, it should be appreciated that central display 460 may correspond to any display which is oriented and configured such that a vehicle operator may view the display 460 while maintaining visual contact on the road ahead.

Finally, system 400 depicts an optional proximity sensor subsystem 470. In one embodiment, the subsystem 470 may be the previously-mentioned machine vision system. In one embodiment, subsystem 470 may be configured to detect a vehicle operator's relative position with respect to the plurality of vehicle controls 440, or with respect to any subset of such controls. Alternatively, control sensors 450 may be used in combination to determine a vehicle operator's relative position.

Figure 5:
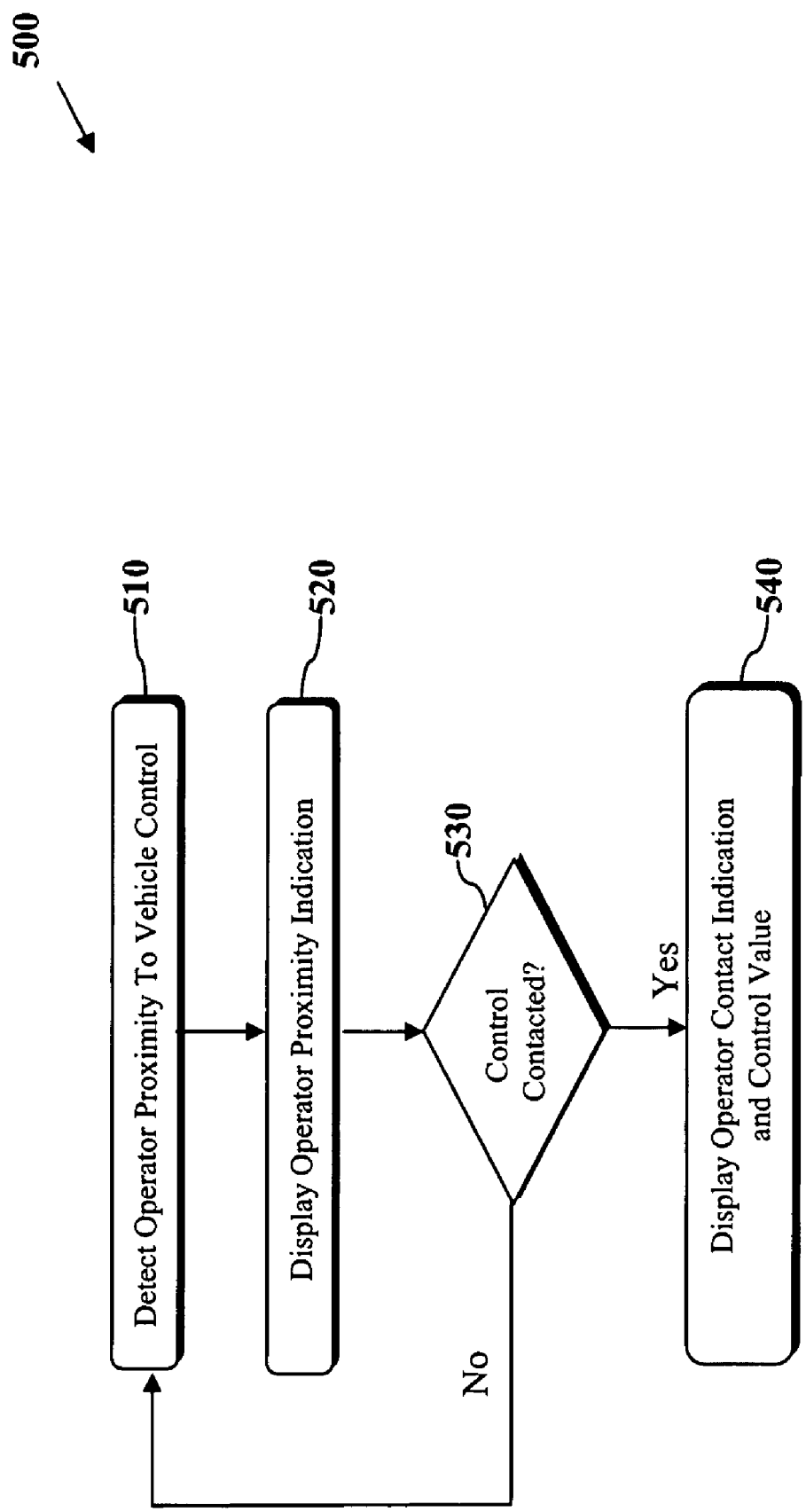
FIG. 5 depicts one embodiment of a process for carrying out one or more aspects of the invention.

Referring now to FIG. 5, depicted is a process for displaying control information to a vehicle operator (e.g., operator 110 of FIGS. 1A-1D) according to one embodiment of the invention. In particular, process 500 begins at block 510 where an operator's proximity to a subject vehicle control (e.g., vehicle control 440 of FIG. 4) is detected by a sensor circuit that is coupled to the vehicle control (e.g., control sensor 450 of FIG. 4). Thereafter, at block 520 an indication of the operator's proximity to the subject control may be displayed in a central display area (e.g., central display area 140, central display 460, etc.). In one embodiment, this indication may be in the form of a graphical representation of the subject vehicle control (e.g., graphical representation 150 of FIG. 1B). In addition, the graphical representation may have some characteristic which is representative of the distance between the operator and the subject control. As depicted in FIGS. 3A-3D, in one embodiment the size of the control's displayed graphical representation may increase as the distance between the operator and the subject control decreases. However, any other physical characteristic may be similarly used to represent such distance.

Process 500 continues to block 530 where a determination may be made as to whether the vehicle operator has contacted the subject vehicle control. If not, process 500 may simply loop back to block 510 where the operator proximity indication may be updated and where the graphical representation may continue to be displayed. However, if the operator has made contact with the control value, then process 500 may continue to block 540 where an indication that the operator has now actually contacted the subject control may be displayed in the central display area. In one embodiment, such an indication may be in the form of a larger version of the control's graphical representation displayed above at block 520. In addition, a current control value associated with the subject control may be displayed simultaneously with the graphical representation (e.g., graphical representation 170 of FIG. 1D). While detecting that the operator has made contact with the subject control may be performed in numerous ways, in one embodiment the proximity sensor circuit associated with the subject control may detect the such contact upon the circuit being grounded.

Figure 6:
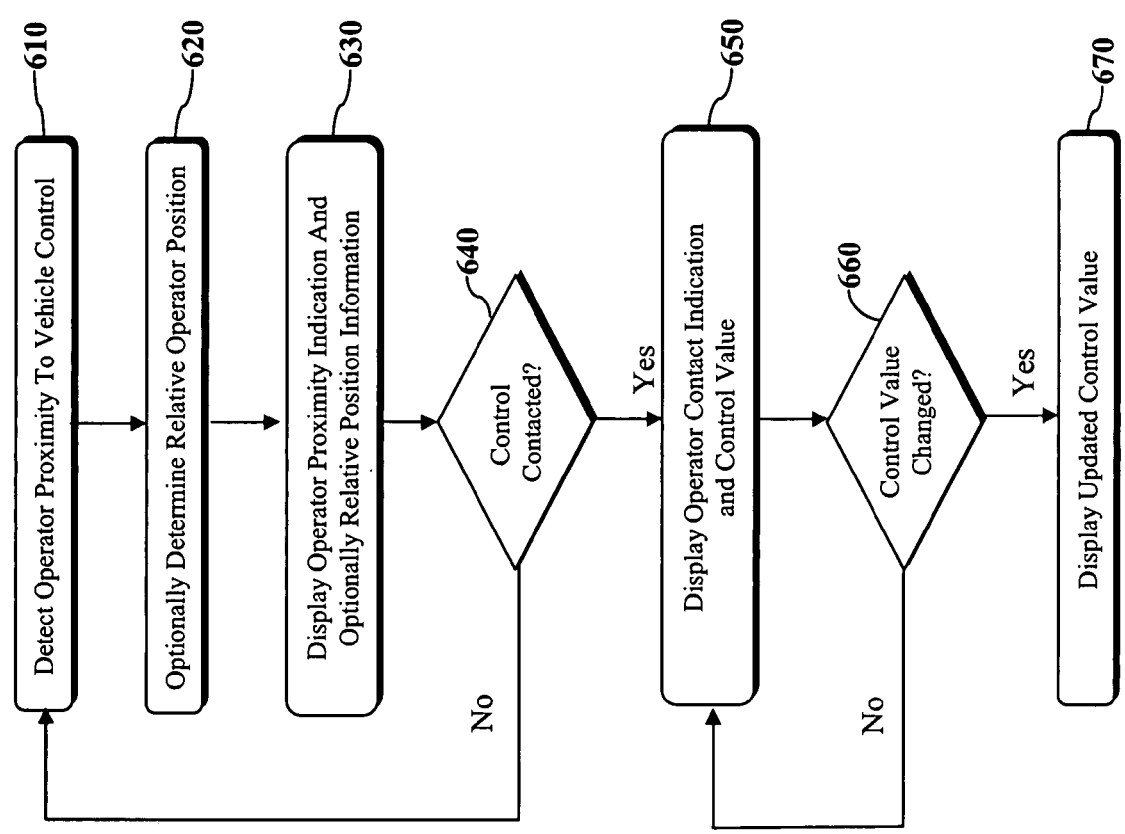
FIG. 6 depicts another embodiment of a process for carrying out one or more aspects of the invention.

Referring now to FIG. 6, depicted is a process for displaying control information to a vehicle operator (e.g., operator 110 of FIGS. 1A-1D) according to another embodiment of the invention. As with process 500, process 600 begins at block 610 where an operator's proximity to a subject vehicle control (e.g., vehicle control 440 of FIG. 4) is detected by a sensor circuit that is coupled to the vehicle control (e.g., control sensor 450 of FIG. 4). However, at block 620 process 600 may optionally determine a relative position of the operator to the subject control (e.g., using proximity sensor subsystem 470 of FIG. 4). While in one embodiment, this may be accomplished using a so-called machine vision system, in another embodiment this determination may be based on triangulating position between three or more control sensors (e.g., control sensors 450).

Regardless of the technique for determining the relative position information of block 620, process 600 continues to block 630 where an indication of the operator's proximity to the subject control may be displayed in a central display area (e.g., central display area 140, central display 460, etc.). In certain embodiments, this indication will be in the form of a graphical representation of the subject vehicle control (e.g., graphical representation 150 of FIG. 1B). In addition, the graphical representation may have some characteristic which is representative of the distance between the operator and the subject control. As depicted in FIGS. 3A-3D, in one embodiment the size of the control's displayed graphical representation may increase as the distance between the operator and the subject control decreases. Optionally, the relative position information of block 620 may be similarly displayed in the central display area (e.g., as graphical representation 240 of FIG. 2A). In one embodiment, the relative position information is conveyed by displaying the graphical representation in a particular orientation within the central display area.

Continuing to refer to FIG. 6, process 600 continues to block 640 where a determination may be made as to whether the vehicle operator has contacted the subject vehicle control. If not, process 600 may simply loop back to block 610 where the operator proximity indication may be updated and, optionally, the relative position indication as well.

If, on the other hand, the operator has made contact with the control value, then process 600 may continue to block 650 where an indication that the operator has now actually contacted the subject control may be displayed in the central display area. As previously discussed, such an indication may be in the form of a larger version of the control's graphical representation displayed above at block 630. Moreover, a current control value associated with the subject control similarly may be displayed simultaneously with the graphical representation (e.g., graphical representation 160 of FIG. 1C).

At this point, process 600 may continue to block 660 where a determination may be made as to whether the operator has changed the current control value by, for example, actuating the subject control. If not, process 600 may simply loop back to 650 where the indication and current control value continue to be displayed. If, on the other hand, the operator has changed the current control value, then process 600 may continue to block 670 where the updated control value is displayed in the central display area (e.g., graphical representation 170 of FIG. 1D). In this fashion, process 600 may be used to enable a vehicle operator to locate, contact and change a vehicle control while never glancing away from the direction of the road ahead.

While the invention has been described in connection with various embodiments, it should be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for displaying vehicle control information in a central display, the method comprising the acts of:
   detecting a first operator proximity to a vehicle control;
   displaying, on the central display, a first graphical representation of the vehicle control in response to said detecting the first operator proximity, wherein the first graphical representation has a first characteristic;
   detecting operator contact of the vehicle control;
   displaying, on the central display, a second graphical representation of the vehicle control in response to said detecting operator contact, wherein the second graphical representation includes a current control value for the vehicle control;
   detecting an operator change of the current control value;
   displaying a third graphical representation of the vehicle control in response to said detecting the operator change, wherein the third graphical representation includes a new control value for the vehicle control.

2. A system for displaying vehicle control information comprising:

a vehicle control;
a control sensor coupled to the vehicle control and configured to detect a first operator proximity to the vehicle control and to detect operator contact of the vehicle control; and
a central display coupled to the control sensor and configured to display a first graphical representation of the vehicle control having a first characteristic in response to the first operator proximity, and further configured to display a second graphical representation of the vehicle control in response to the operator contact, wherein the second graphical representation includes a current control value for the vehicle control,
wherein the control sensor is further configured to determine a first operator position relative to the vehicle control, and wherein the central display is further configured to display the first graphical representation in an orientation representative of the first operator position.

3. A method for displaying vehicle control information in a central display, the method comprising the acts of:
detecting a first operator proximity to a vehicle control;
displaying, on the central display, a first graphical representation of the vehicle control in response to said detecting the first operator proximity, wherein the first graphical representation has a first characteristic;
detecting operator contact of the vehicle control;
displaying, on the central display, a second graphical representation of the vehicle control in response to said detecting operator contact, wherein the second graphical representation includes a current control value for the vehicle control; and
determining a first operator position relative to the vehicle control, and wherein displaying the first graphical representation comprises displaying the first graphical representation in an orientation representative of the first operator position.

4. The method of claim 3, further comprising the act of determining a second operator position relative to an adjacent vehicle control, and wherein displaying the first graphical representation comprises displaying the first graphical representation in an orientation representative of both the first operator position and the second operator position.

5. The method of claim 1, wherein the vehicle control is a control for a vehicle-related variable selected from the list consisting of: cabin temperature, fan speed, tuned radio station, radio volume and headlight setting.

6. The method of claim 1, wherein detecting the first operator proximity comprises detecting that a vehicle operator has moved to within a first predetermined distance from the vehicle control.

7. The method of claim 6, further comprising the acts of:
detecting a second operator proximity to the vehicle control, wherein the second operator proximity indicates that the vehicle operator has moved to within a second predetermined distance from the vehicle control, said second predetermined distance being less than said first predetermined distance; and
displaying the first graphical representation having a second characteristic in response to said detecting the second operator proximity, wherein the characteristic is different than the first characteristic.

8. The method of claim 1, further comprising the act of configuring a proximity sensor circuit within the vehicle control to perform said detecting the first operator proximity and said detecting operator contact.

9. The method of claim 1, wherein the first graphical representation comprises an icon representative of the vehicle control, and wherein the second graphical representation comprises the current control value and the icon having a second characteristic which is different than the first characteristic.

10. A system for displaying vehicle control information comprising:
a vehicle control;
a control sensor coupled to the vehicle control;
a central display; and
a processor electrically connected to the vehicle control, the control sensor and the central display, wherein the processor is configured to:
receive, from the control sensor, a first operator proximity to a vehicle control,
display, on the central display, a first graphical representation of the vehicle control in response to the first operator proximity, wherein the first graphical representation has a first characteristic,
receive, from the control sensor, an operator contact of the vehicle control,
display, on the central display, a second graphical representation of the vehicle control in response to the operator contact, wherein the second graphical representation includes a current control value for the vehicle control,
receive, from the control sensor, an operator change of the current control value, and
display, on the central display, a third graphical representation of the vehicle control in response to the operator change, wherein the third graphical representation includes a new control value for the vehicle control.

11. The system of claim 2, wherein the control sensor is further configured to determine a second operator position relative to an adjacent vehicle control, and wherein the central display is further configured to display the first graphical representation in an orientation representative of both the first operator position and the second operator position.

12. A system for displaying vehicle control information comprising:
a vehicle control;
a control sensor coupled to the vehicle control;
a central display; and
a processor electrically connected to the vehicle control, the control sensor and the central display, wherein the processor is configured to:
receive, from the control sensor, a first operator proximity to a vehicle control.
display, on the central display, a first graphical representation of the vehicle control in response to the first operator proximity, wherein the first graphical representation has a first characteristic,
receive, from the control sensor, an operator contact of the vehicle control,
display, on the central display, a second graphical representation of the vehicle control in response to the operator contact, wherein the second graphical representation includes a current control value for the vehicle control,
determine a first operator position relative to the vehicle control, and
display, on the central display, the first graphical representation in an orientation representative of the first operator position.

13. The system of claim 12, wherein the processor is further configured to:

determine a second operator position relative to an adjacent vehicle control, and display, on the central display, the first graphical representation in an orientation representative of both the first operator position and the second operator position.

14. The system of claim 10, wherein the vehicle control is a control for a vehicle-related variable selected from the list consisting of: cabin temperature, fan speed, tuned radio station, radio volume and headlight setting.

15. The system of claim 10, wherein the first operator proximity corresponds to a vehicle operator moving to within a first predetermined distance of the vehicle control.

16. The system of claim 15, wherein the processor is further configured to:

receive, from the control sensor, a second operator proximity to the vehicle control, wherein the second operator proximity indicates that the vehicle operator has moved to within a second predetermined distance from the vehicle control, said second predetermined distance being less than said first predetermined distance; and display, on the central display, the first graphical representation having a second characteristic in response to the second operator proximity, wherein the second characteristic is different than the first characteristic.

17. The system of claim 10, wherein the first graphical representation comprises an icon representative of the vehicle control, and wherein the second graphical representation comprises the current control value and the icon having a second characteristic which is different than the first characteristic.

18. A system for displaying vehicle control information comprising:

a vehicle control;

a control sensor coupled to the vehicle control and configured to detect a first operator proximity to the vehicle control and to detect operator contact of the vehicle control; and a central display coupled to the control sensor and configured to display a first graphical representation of the vehicle control having a first characteristic in response to the first operator proximity, and further configured to display a second graphical representation of the vehicle control in response to the operator contact, wherein the second graphical representation includes a current control value for the vehicle control, wherein the vehicle control is configured to detect an operator change of the current control value, and wherein the central display is further configured to display a third graphical representation of the vehicle control in response to the operator change, wherein the third graphical representation includes a new control value for the vehicle control.

19. The system of claim 18, wherein the vehicle control is a control for a vehicle-related variable selected from the list consisting of: cabin temperature, fan speed, tuned radio station, radio volume and headlight setting.

20. The system of claim 18, wherein the control sensor is to detect the first operator proximity by detecting that the vehicle operator has moved to within a first predetermined distance from the vehicle control.

21. The system of claim 20, wherein the control sensor is further configured to detect a second operator proximity to the vehicle control, wherein the second operator proximity indicates that the vehicle operator has moved to within a second predetermined distance from the vehicle control, said second predetermined distance being less than said first predetermined distance, and wherein the central display is further configured to display the first graphical representation having a second characteristic in response to the second operator proximity, wherein the second characteristic is different than the first characteristic.

22. The system of claim 18, wherein the first graphical representation comprises an icon representative of the vehicle control, and wherein the second graphical representation comprises the current control value and the icon having a second characteristic which is different than the first characteristic.

* * * * *